(12) United States Patent
Iwamura et al.

(10) Patent No.: US 8,135,408 B2
(45) Date of Patent: Mar. 13, 2012

(54) USER EQUIPMENT AND METHOD USED IN USER EQUIPMENT

(75) Inventors: Mikio Iwamura, Yokohama (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 317 days.

(21) Appl. No.: 12/445,211

(22) PCT Filed: Oct. 29, 2007

(86) PCT No.: PCT/JP2007/071040
§ 371 (c)(1),
(2), (4) Date: May 5, 2009

(87) PCT Pub. No.: WO2008/053844
PCT Pub. Date: May 8, 2008

(65) Prior Publication Data
US 2010/0048210 A1   Feb. 25, 2010

(30) Foreign Application Priority Data

Oct. 31, 2006   (JP) ................. 2006-297052

(51) Int. Cl.
*H04Q 7/20* (2006.01)
(52) U.S. Cl. ......... 455/436; 455/442; 455/439; 370/335
(58) Field of Classification Search ............... 455/436
See application file for complete search history.

(56) References Cited

U.S. PATENT DOCUMENTS 7,477,898 B2 * 1/2009 Hidaka ................. 455/436

FOREIGN PATENT DOCUMENTS

| JP | 2005-260427 A | 9/2005 |
|---|---|---|
| JP | 2006-050630 A | 2/2006 |
| JP | 2006-074265 A | 3/2006 |

OTHER PUBLICATIONS

International Search Report for PCT/JP2007/071040 mailed Feb. 5, 2008 (9 pages).
Written Opinion of ISA (JP) for PCT/JP2007/071040 mailed Feb. 5, 2008 (4 pages).
3GPP TS 25.331 V7.2.0, Sep. 2006 "Technical Specification Group Radio Access Network; Radio Resource Control (RRC); Protocol Specification" (Release 7) 8.1.4, 8.5.2, 10.3.3.29 (7 pages).
3GPP TS 25.304 V6.9.0 Mar. 2006 "Technical Specification Group Radio Access Network; User Equipment (UE) Procedures in Idle Mode and Procedures for Cell Reselection in Connected Mode" (Release 6) (38 pages).

* cited by examiner

*Primary Examiner* — Charles Appiah
*Assistant Examiner* — Randy Peaches
(74) *Attorney, Agent, or Firm* — Osha Liang LLP

(57) ABSTRACT

Disclosed user equipment performs intermittent reception in a different frequency from a frequency of a serving cell belonging to a current radio access network or in a different radio access network from the current radio access network. The user equipment includes a receiving unit for receiving and demodulating a control signal and a cell search unit for performing a cell search in a specified frequency. When a release signal is received, the user equipment switches to a preliminary intermittent reception mode where the receiving unit intermittently receives the control signal in the serving cell and the cell search unit performs the cell search in the different frequency or the different radio access network between intermittent reception timings. Then, the user equipment switches to a normal intermittent reception mode where the receiving unit intermittently receives the control signal in the different frequency or the different radio access network.

8 Claims, 5 Drawing Sheets

USER EQUIPMENT AND METHOD USED IN USER EQUIPMENT

TECHNICAL FIELD

The present invention generally relates to the field of mobile communications. More particularly, the present invention relates to user equipment used in a mobile communication system and a method used in the user equipment.

BACKGROUND ART

In the field of mobile communications, technologies enabling handover between radio access networks or mobile communication systems using the same or different radio access technologies (RATs) have been proposed. Such technologies, for example, enable user equipment, after completing a call in a radio access network, to enter a standby mode in a different radio access network. This in turn makes it possible to distribute the load of a radio access network to other radio access networks when the radio access network becomes congested and thereby makes it possible to increase the total capacity and throughput of the radio access networks.

FIG. 1 shows handover between radio access networks and mobile communication systems using the same or different RATs. In this example, a third generation system (3G-RAT system) including radio access networks using a first frequency $f_1$ and a second frequency $f_2$ and a second generation system (2G-RAT system) using a third frequency $f_3$ coexist in the same geographical area. Examples of the 2G-RAT system include GSM and PDC systems. In FIG. 1, when user equipment UE completes a call using the first frequency $f_1$, the user equipment UE enters a standby mode in the second frequency $f_2$ or the 2G-RAT system.

FIG. 2 shows handover between systems using different RATs. In FIG. 2, user equipment UE switches from an active mode to an idle mode after completing a call. When the user equipment UE completes a call (S1), a base station of a serving cell (in this example, a base station eNB in the 3G-RAT system) sends a radio resource control (RRC) release signal indicating release of a connection to the user equipment UE (S2). In response to the RRC release signal, the user equipment UE returns an RRC release complete signal (S3). As a result, the connection is released. When the user equipment UE is to stand by in a different frequency or a different RAT system, the user equipment UE searches for a destination cell (performs a cell search) in the different frequency or the different RAT system. An instruction or redirection information indicating the different frequency or the different RAT system in which the user equipment UE is to perform the cell search is sent from the base station together with the RRC release signal or at a different timing. When the destination cell is determined, the user equipment UE receives, for example, broadcast information from the destination cell and sends a location area update request (S5). As a result, the user equipment UE is registered in a location area of the different RAT system (S6). The location area may also be called a tracking area (TA) or a routing area (RA). Then, the user equipment UE intermittently monitors a paging channel in the destination cell (in this example, a cell in a GSM system) and waits for an incoming call (S7). Technologies relating to handover between networks or systems using the same or different RATs are described, for example, in 3GPP TS25.331 and 3GPP TS25.304.

DISCLOSURE OF INVENTION

Problems to be Solved by the Invention

In the example shown in FIG. 2, the user equipment UE cannot receive incoming call notification during a period D between a time when the connection is released and a time when the user equipment UE is registered in the location area of the destination cell because the user equipment UE is not connected to any cell during the period D. This may happen during handover between systems using different RATs as well as between networks using the same RAT but different frequencies. The period D during which the user equipment UE cannot receive incoming call notification corresponds to a period of time necessary for the cell search. If the cell search takes a long time, the period D increases and the user may suffer inconvenience.

One object of the present invention is to at least reduce a period of time during which user equipment cannot receive incoming call notification in a case where the user equipment, when receiving a release signal indicating release of a connection in a current radio access network, goes into a standby mode in a frequency different from that of a serving cell or in a different radio access network.

Means for Solving the Problems

An aspect of the present invention provides user equipment that performs intermittent reception in a different frequency from a frequency of a serving cell belonging to a current radio access network or in a different radio access network from the current radio access network. The user equipment includes a receiving unit configured to receive and demodulate a control signal and a cell search unit configured to perform a cell search in a specified frequency. When a release signal indicating release of a connection in the current radio access network is received, the user equipment switches to a preliminary intermittent reception mode where the receiving unit intermittently receives the control signal in the serving cell and the cell search unit performs the cell search in the different frequency or the different radio access network between intermittent reception timings. Then, the user equipment switches to an intermittent reception mode where the receiving unit intermittently receives the control signal in the different frequency or the different radio access network.

Advantageous Effect of the Invention

An aspect of the present invention makes it possible to at least reduce a period of time during which user equipment cannot receive incoming call notification in a case where the user equipment, when receiving a release signal indicating release of a connection in a current radio access network, goes into a standby mode in a frequency different from that of a serving cell or in a different radio access network.

EXPLANATION OF REFERENCES

Figure 1:
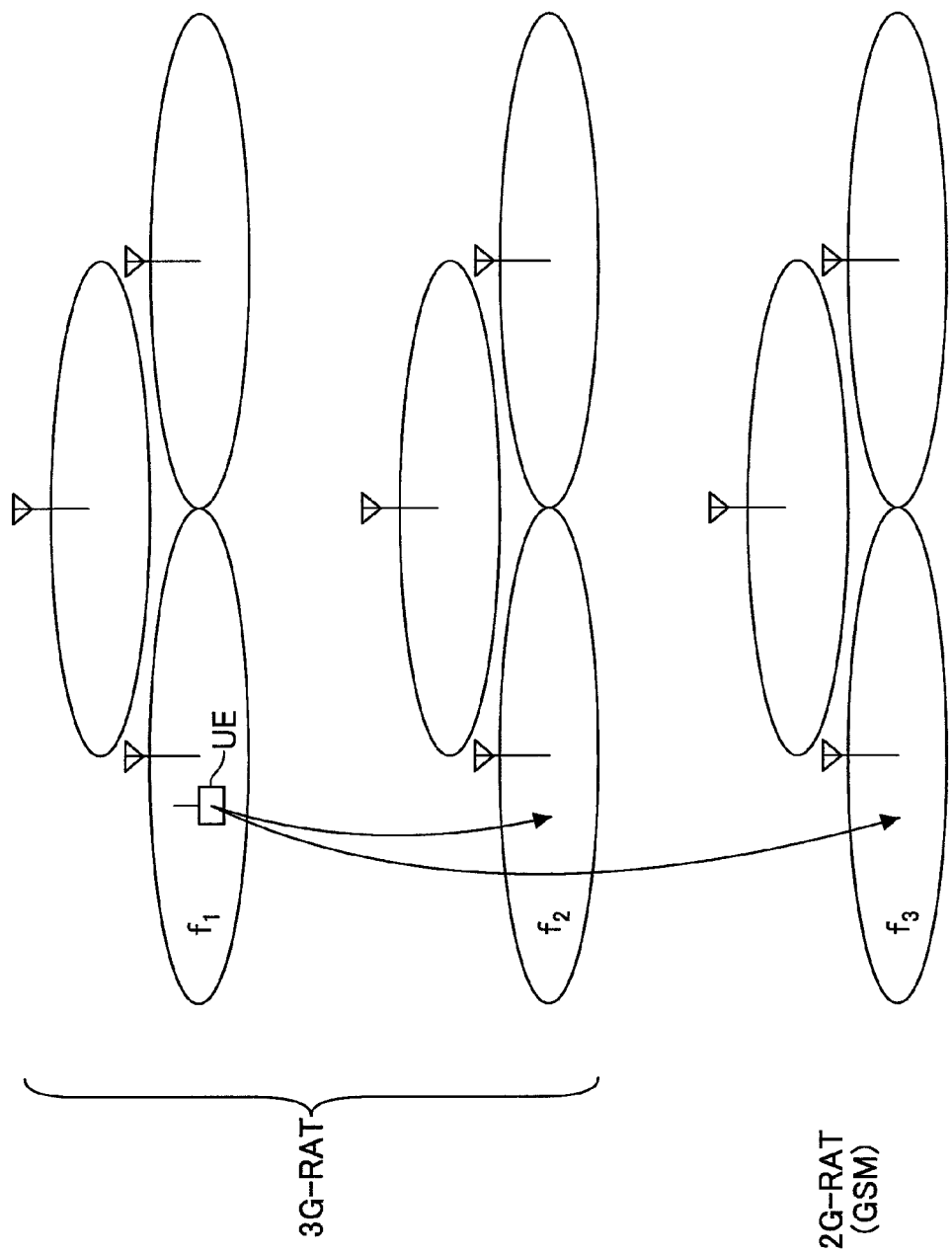
FIG. 1 is a drawing illustrating handover between mobile communication systems using different RATs.

302 Antenna
304 Duplexer
306 Receiving unit
308 L1/L2 control signal processing unit
310 RRC processing unit
312 Control unit
314 Measuring unit
316 Transmitting unit

BEST MODE FOR CARRYING OUT THE INVENTION

According to an embodiment of the present invention, user equipment switches to a preliminary intermittent reception mode for intermittently receiving a control signal in a serving cell when receiving an RRC release signal. The user equipment performs a cell search in a different frequency or a different radio access network between intermittent reception timings. Then, the user equipment switches to a normal intermittent reception mode for intermittently receiving a control signal in the different frequency or the different radio access network. With this configuration, the cell search is performed while the user equipment is connected to the serving cell. Thus, this configuration substantially prevents a situation where the user equipment is not registered in any location area during a connection process to a destination cell and makes it possible to send incoming call notification to the user equipment without interruption.

The release signal may include timing information indicating intermittent reception timings in the preliminary intermittent reception mode, duration information indicating duration of the preliminary intermittent reception mode, and number-of-times information indicating the number of times the control signal is received intermittently.

The release signal may also include frequency information indicating a different frequency or standby information necessary for the user equipment to stand by in a different radio access network.

Further, the release signal may include identification information of a location area of a cell using the different frequency or a cell in the different radio access network where the user equipment is to stand by.

The frequency information indicating the different frequency or the standby information necessary for the user equipment to stand by in the different radio access network may be included in broadcast information of the serving cell.

The user equipment may be configured to switch to the normal intermittent reception mode for intermittently receiving a control signal in the different frequency or the different radio access network if the preliminary intermittent reception mode continues longer than a predetermined period of time.

An intermittent reception interval in the preliminary intermittent reception mode is preferably shorter than an intermittent reception interval in the normal intermittent reception mode.

Although the present invention is described below in different embodiments, the distinctions between the embodiments are not essential for the present invention, and the embodiments may be implemented individually or in combination.

First Embodiment

Figure 3:
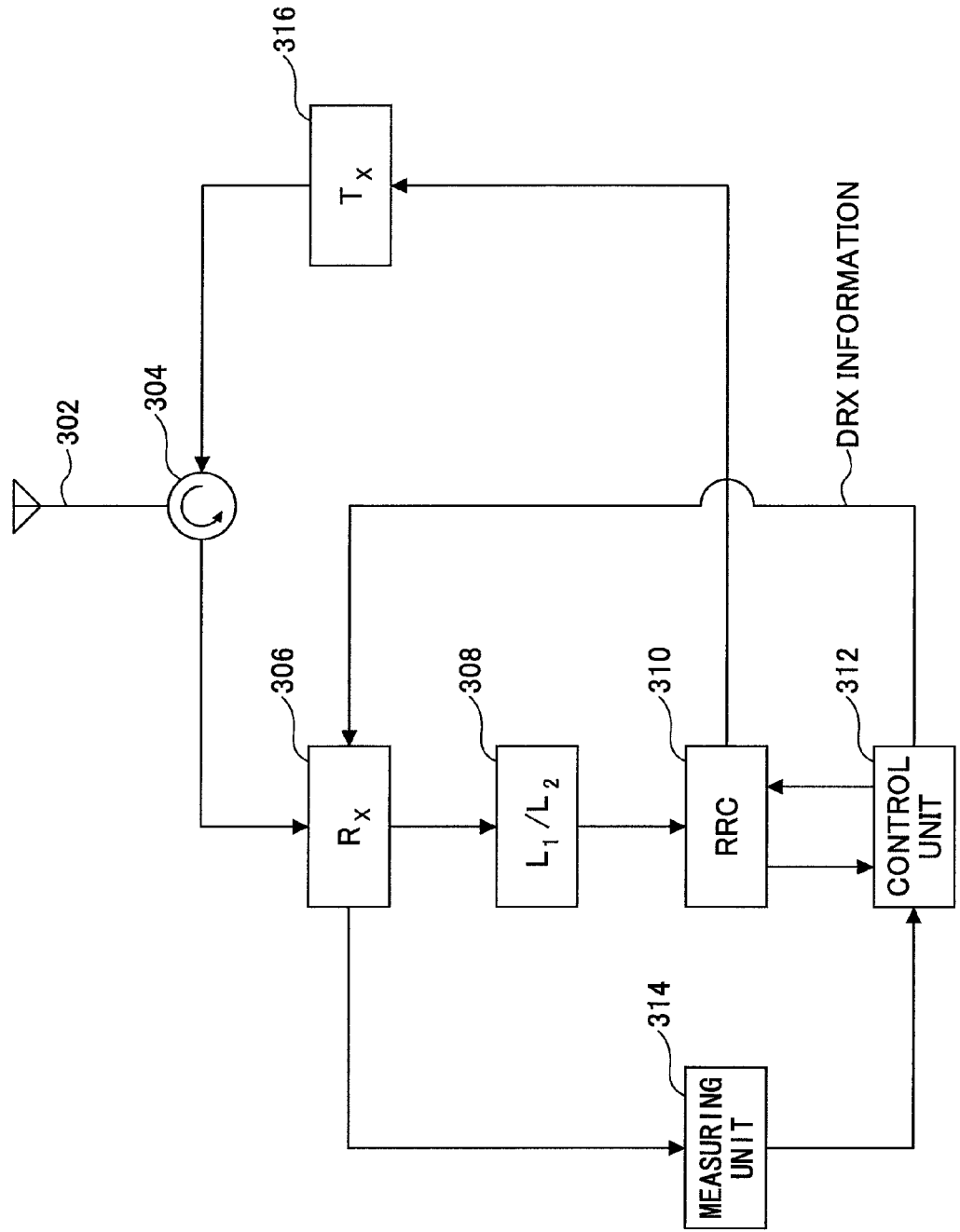
FIG. 3 is a schematic block diagram illustrating user equipment according to an embodiment of the present invention.

FIG. 3 is a drawing illustrating user equipment according to an embodiment of the present invention. FIG. 3 mainly shows functional elements of the user equipment that are relevant to this embodiment. As shown in FIG. 3, the user equipment includes an antenna 302, a duplexer 304, a receiving unit 306, an L1/L2 control signal processing unit 308, an RRC processing unit 310, a control unit 312, a measuring unit 314, and a transmitting unit 316.

The duplexer 304 is connected to the antenna 302 used both for transmission and reception and properly switches the paths to and from the antenna 302 for transmitted and received signals.

The receiving unit 306 appropriately processes a received radio signal and extracts a lower-layer control signal (L1/L2 control signal), a reference signal (pilot signal), a data signal, and so on from the received radio signal when the user equipment is in an active mode. For brevity, functional elements related to data signals are omitted in FIG. 3. When the user equipment is in an idle mode, the receiving unit 306 receives a control signal at intermittent reception timings. Intermittent reception information (DRX information) including the intermittent reception timings, an intermittent reception interval, and duration of intermittent reception may be provided from the control unit 312 to the receiving unit 306 or may be predetermined in the system. In this embodiment, as described later, preliminary intermittent reception is performed before the connection is released and normal intermittent reception is performed in a different frequency or a different radio access network after the connection is released.

The L1/L2 control signal processing unit 308 demodulates a lower-layer control signal related to the physical layer and extracts information such as radio resource allocation information, higher-layer control information, and delivery confirmation information (ACK/NACK) of a transmitted uplink data signal from the lower-layer control signal. In this embodiment, the user equipment receives an L1/L2 control signal as needed when it is in the active mode and receives an L1/L2 control signal intermittently when it is in the idle mode.

The RRC processing unit 310 extracts information regarding radio resource control (RRC). The RRC processing unit 310 extracts and generates various information necessary for processes such as establishment, reestablishment, maintenance, and release of an RRC connection, allocation of radio resources, management of active and idle modes, and mobility management of connections. For example, when receiving an RRC release signal indicating release of a connection, the RRC processing unit 310, in response, generates an RRC release complete signal. Also, when the location area (may also be called a tracking area or a routing area) changes, the RRC processing unit 310 generates a signal (e.g., a TAU signal or a RAU signal) requesting update of the location area.

The control unit 312 controls other functional elements of the user equipment based on information sent from the RRC processing unit 310.

The measuring unit 314 performs a cell search in a specified frequency. The specified frequency may be the same as or different from the frequency used in the serving cell. In the cell search, the measuring unit 314 measures reception quality of reference signals from neighboring cells.

The transmitting unit 316 converts a baseband transmission signal into a radio transmission signal.

Figure 4:
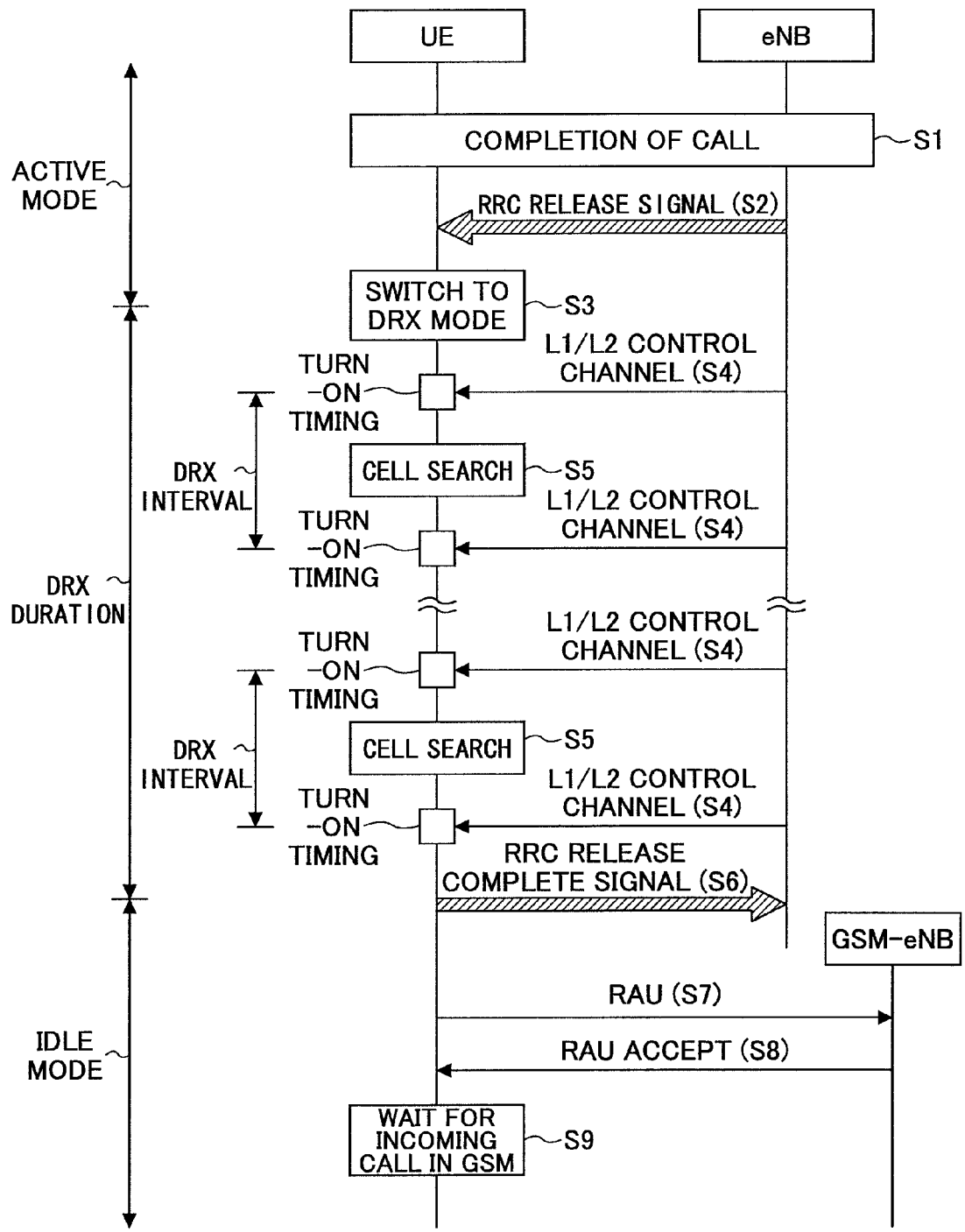
FIG. 4 is a flowchart showing an exemplary process according to an embodiment of the present invention.

FIG. 4 is a flowchart showing an exemplary process according to an embodiment of the present invention. In step S1, a call-end event is detected and release of a connection is determined. A call-end event is detected, for example, when the user indicates an end of a call (e.g., by pressing an on-hook button) or when a predetermined period of time passes with no transmission and reception of data.

In step S2, a base station eNB sends an RRC release signal indicating release of the connection to user equipment UE. In this embodiment, the user equipment UE, after switching to the idle mode, stands by in a different cell (a cell in the same radio access network but using a different frequency or a cell in a different radio access network) that is different from a cell to which the user equipment UE has been connected while it is in the active mode. Information regarding the different frequency or the different radio access network used during the idle mode is included in the RRC release signal as redirection information. The redirection information also includes preliminary intermittent reception information (DRX information) regarding preliminary intermittent reception to be performed in the serving cell. The preliminary intermittent reception information may include one or more of intermittent reception timings, an intermittent reception interval, and the maximum duration or the maximum number of times of intermittent reception.

In step S3, the user equipment UE switches to an operation mode where it receives a control signal intermittently according to the preliminary intermittent reception information.

In steps S4, the user equipment UE, for example, receives a control signal (e.g., L1/L2 control signal or paging signal) at intervals of 20 ms and demodulates the control signal.

In steps S5, the user equipment UE performs a cell search according to the redirection information between the intermittent reception timings of the control signal. In the cell search, the user equipment UE searches for a cell belonging to the current radio access network but using a different frequency or a cell belonging to a different radio access network. The redirection information indicates a cell to be searched for by the user equipment UE. In the example shown in FIG. 4, the user equipment UE belongs to a 3G-RAT system (of this embodiment) in the active mode and migrates to a 2G-RAT system (GSM system) when it goes into the idle mode. Although the GSM (2G-RAT) system is used as an example of a destination system in FIG. 4, the destination system may employ any other radio access technology. In steps S5 of this exemplary process, the user equipment UE searches the GSM system and selects a cell that is most suitable as the destination. As shown in FIG. 4, the cell search may be performed repeatedly between the intermittent reception timings in a different frequency or in a different radio access network.

In step S6, the user equipment UE sends an RRC release complete signal for releasing the connection to the base station eNB in response to the RRC release signal. The RRC release complete signal may be sent when the cell search in steps S5 is completed or when a predetermined DRX duration (e.g., 200 ms) passes. During a period before step S6, particularly during a period when the preliminary intermittent reception is performed, the user equipment UE is still connected to the same cell as in the active mode. Therefore, if there is an incoming call for the user equipment UE during the preliminary intermittent reception, it is possible to report the presence of the incoming call to the user equipment UE using a control signal (such as a paging signal) that is received intermittently. Although not shown in FIG. 4, if an incoming call is detected, the connection is reestablished.

In step S7, the user equipment UE receives a broadcast signal from the cell in the GSM system found in the cell search and starts a process necessary to wait for an incoming call. For example, the user equipment UE obtains identification information indicating a location area to which the cell found in the cell search belongs from the broadcast signal and sends a location area update request (S7). The location area update request is represented, for example, by a routing area update (RAU) message or a tracking area update (TAU) message. In response to the RAU message, the cell of the GSM system updates the location area of the user equipment UE (S8). If the base station eNB sending the RRC release signal has already known the identification information of the location area to be reported in step S7, the identification information may also be included in the RRC release signal. This enables the user equipment UE to quickly report the identification information to the base station GSM-eNB.

In step S9, the user equipment UE enters the idle mode in the selected cell that is different from the cell to which the user equipment UE is connected during the active mode and monitors a paging signal at intermittent reception timings. The intermittent reception in step S9 is performed in a normal standby mode and the intermittent reception interval may be as long as 1000 ms (1 sec). Meanwhile, the preliminary intermittent reception described above is performed to wait for an incoming call while searching for a destination cell. Therefore, parameters for the preliminary intermittent reception such as the intermittent reception interval and the maximum duration are determined such that a cell search in a different frequency or a different radio access network can be performed.

Figure 2:
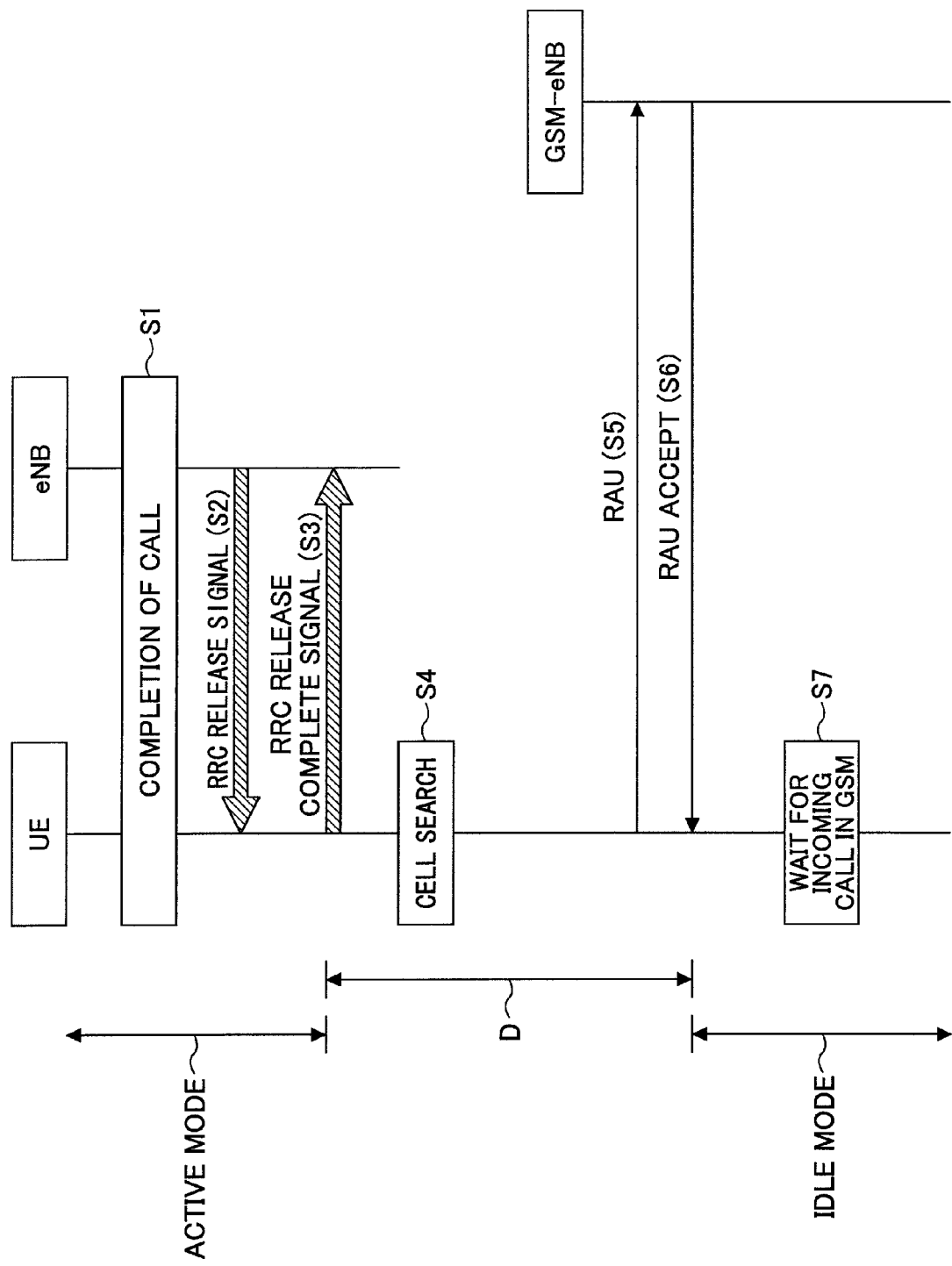
FIG. 2 is a drawing used to describe a problem in the related art.

Thus, in this embodiment, the user equipment UE is still connected to the same serving cell as in the active mode while the preliminary intermittent reception is performed, but stands by in a cell found by the cell search after sending the RRC release complete signal (in S6). Unlike the related-art method (FIG. 2), this configuration makes it possible to substantially eliminate time during which user equipment is not able to receive incoming call notification.

Second Embodiment

In the first embodiment, an RRC release signal includes redirection information and the redirection information includes preliminary intermittent reception information and information on a cell to be searched for in a cell search. However, the redirection information is not necessarily included in the RRC release signal. For example, the redirection information may be sent to user equipment as broadcast information.

Figure 5:
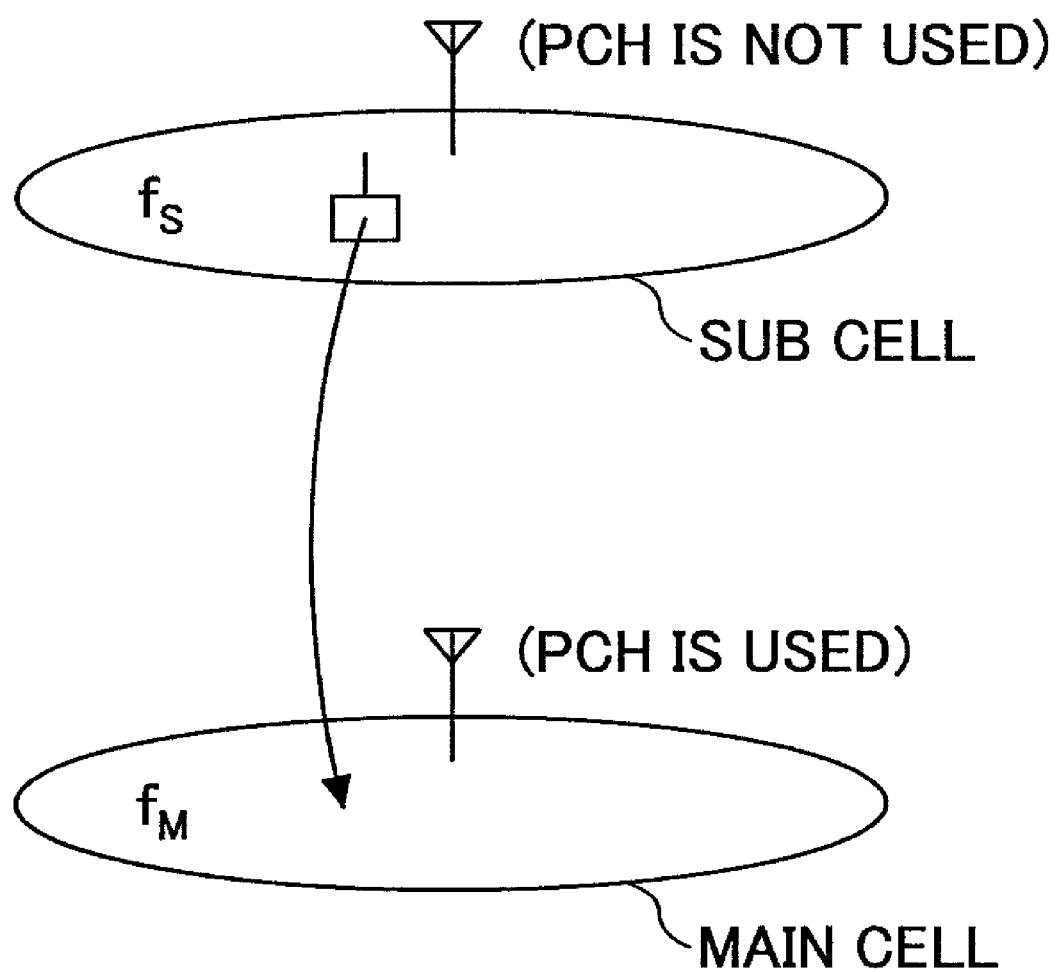
FIG. 5 is a drawing used to describe a variation of an embodiment of the present invention.

FIG. 5 shows two cells belonging to the same or different types of radio access networks that coexist in the same area. One of the cells is called a main cell and the other is called a sub cell. Here, it is assumed that all control signals such as a broadcast signal and a paging signal are transmitted as necessary in the main cell, and no paging signal is transmitted in the sub cell. A frequency $f_M$ used in the main cell is different from a frequency $f_S$ used in the sub cell. Based on these assumptions, the main cell can accommodate both user equipment in the active mode and user equipment in the idle mode, but the sub cell can accommodate only user equipment in the active mode. Therefore, when the connection of user equipment in the sub cell is released, the user equipment has to enter the idle mode in the main cell. In this case, information indicating that the main cell is the destination cell where user equipment is to enter the idle mode has to be shared by all user equipment. Therefore, instead of sending the information via the RRC release signal to respective user equipment, it is preferable to broadcast the information via a broadcast signal.

The present invention is not limited to the specifically disclosed embodiments, and variations and modifications may be made without departing from the scope of the present invention. Although specific values are used in the above descriptions to facilitate the understanding of the present invention, the values are just examples and different values may also be used unless otherwise mentioned. The distinctions between the embodiments are not essential for the present invention, and the embodiments may be used individually or in combination. Although a functional block diagram is used to describe user equipment in the above embodiments, the user equipment may be implemented by hardware, software, or a combination of them.

The present international application claims priority from Japanese Patent Application No. 2006-297052 filed on Oct. 31, 2006, the entire contents of which are hereby incorporated herein by reference.

The invention claimed is:

1. A user equipment comprising:
a receiving unit configured to receive and demodulate a control signal; and
a cell search unit configured to perform a cell search in a specified frequency,
wherein when a release signal indicating release of a connection is received from a serving cell belonging to a current radio access network, the user equipment is configured
to switch to a preliminary intermittent reception mode where the receiving unit intermittently receives the control signal from the serving cell and the cell search unit performs the cell search in a different frequency different from a frequency of the serving cell or a different radio access network different from the current radio access network between intermittent reception timings; and then
to switch to an intermittent reception mode where the receiving unit intermittently receives the control signal from a cell found in the cell search.

2. The user equipment as claimed in claim 1, wherein the release signal includes at least one of timing information indicating the intermittent reception timings in the preliminary intermittent reception mode, duration information indicating duration of the preliminary intermittent reception mode, and number-of-times information indicating a number of times the control signal is to be received intermittently.

3. The user equipment as claimed in claim 1, wherein the release signal includes frequency information indicating the different frequency or standby information necessary for the user equipment to stand by in the different radio access network.

4. The user equipment as claimed in claim 1, wherein the release signal includes identification information of a location area of a cell using the different frequency or of a cell in the different radio access network where the user equipment is to stand by.

5. The user equipment as claimed in claim 1, wherein frequency information indicating the different frequency or standby information necessary for the user equipment to stand by in the different radio access network is included in broadcast information from the serving cell.

6. The user equipment as claimed in claim 1, wherein the user equipment is configured to switch to the intermittent reception mode where the receiving unit intermittently receives the control signal in the different frequency or the different radio access network if the preliminary intermittent reception mode continues longer than a predetermined period of time.

7. The user equipment as claimed in claim 1, wherein an intermittent reception interval in the preliminary intermittent reception mode is shorter than an intermittent reception interval in the intermittent reception mode.

8. A method used in a user equipment in a mobile communication system, comprising the steps of:
receiving a release signal indicating release of a connection from a serving cell belonging to a current radio access network;
switching to a preliminary intermittent reception mode for intermittently receiving a control signal from the serving cell belonging to the current radio access network;
performing a cell search between intermittent reception timings in a different frequency from a frequency of the serving cell or in a different radio access network from the current radio access network; and
switching to an intermittent reception mode for intermittently receiving the control signal from a cell found in the cell search.

* * * * *